United States Patent [19]

Bilodeau

[11] 3,981,667
[45] Sept. 21, 1976

[54] TAKEOUT APPARATUS FOR A BLOW MOLDING MACHINE

[75] Inventor: Richard D. Bilodeau, North Stonington, Conn.

[73] Assignee: Monsanto Company, St. Louis, Mo.

[22] Filed: Jan. 31, 1975

[21] Appl. No.: 545,927

Related U.S. Application Data

[63] Continuation-in-part of Ser. No. 492,001, July 26, 1974.

[52] U.S. Cl. ............................. 425/387 B; 74/814; 198/443; 198/689; 214/1 BH; 264/335; 425/455 R
[51] Int. Cl.² ......................................... B29D 23/03
[58] Field of Search ......... 425/387 B, 242 B, 302 B, 425/305 B, 340, 395, 326 B, 455; 264/294, 297, 334, 335, 336; 198/25, 179, 209, 210, 237, 241, 242, 243, 211; 214/1 BC, 1 BD, 1 BH, 1 BV, 74, 18, 149; 74/102, 813, 814, 815

[56] References Cited
UNITED STATES PATENTS

| | | | |
|---|---|---|---|
| 2,764,459 | 8/1956 | McDonald | 214/149 |
| 2,888,131 | 5/1951 | Allen | 198/25 |
| 3,218,669 | 12/1965 | Barker | 425/296 |
| 3,365,748 | 1/1968 | Cote | 425/233 |
| 3,596,315 | 8/1971 | Yoshikawa | 425/326 |
| 3,764,250 | 10/1973 | Waterloo | 425/326 |
| 3,770,098 | 12/1973 | Baugnies et al. | 198/25 |
| 3,834,522 | 9/1974 | Jackson | 198/210 |

*Primary Examiner*—Francis S. Husar
*Assistant Examiner*—R. J. Charvat
*Attorney, Agent, or Firm*—Michael J. Murphy

[57] ABSTRACT

Takeout apparatus for a blow molding machine which includes a turret assembly having a plurality of article pickup heads which may be suction operable and telescopically mounted to facilitate clearing closely adjacent components during removal of the articles from the molds, turret assembly positioning means for swingably moving the assembly into and out of operative position adjacent the periphery of the path of movement of the molds and drive means for turning the assembly in synchronism with the blow molding machine which may include a clutch operative to cut off power to the turret shaft when the turret assembly is in inoperative position yet while the blow molding machine is operating. The pickup heads may be selectively associated with a positive pressure source to facilitate urging the removed articles onto a downstream conveyor.

8 Claims, 8 Drawing Figures

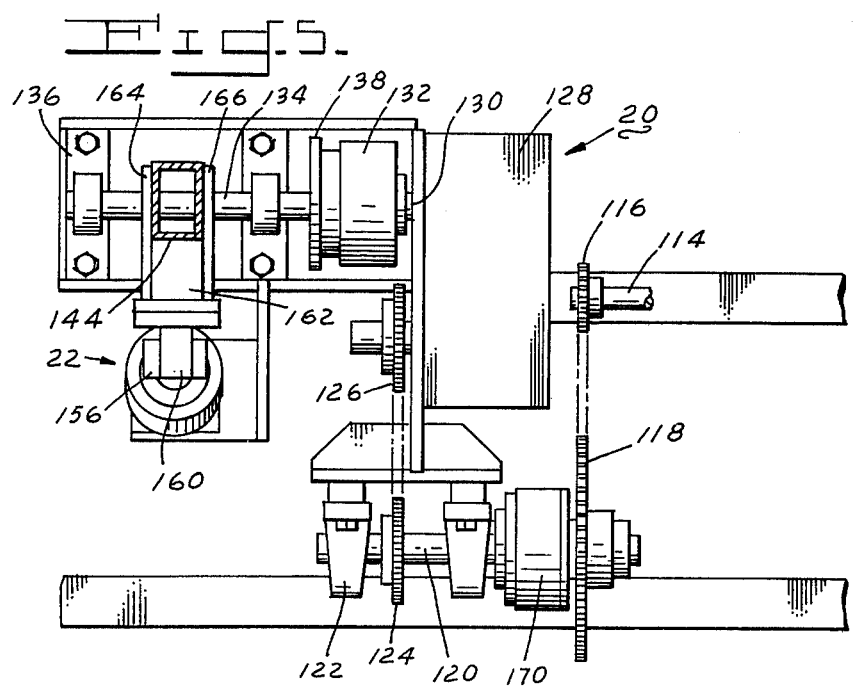
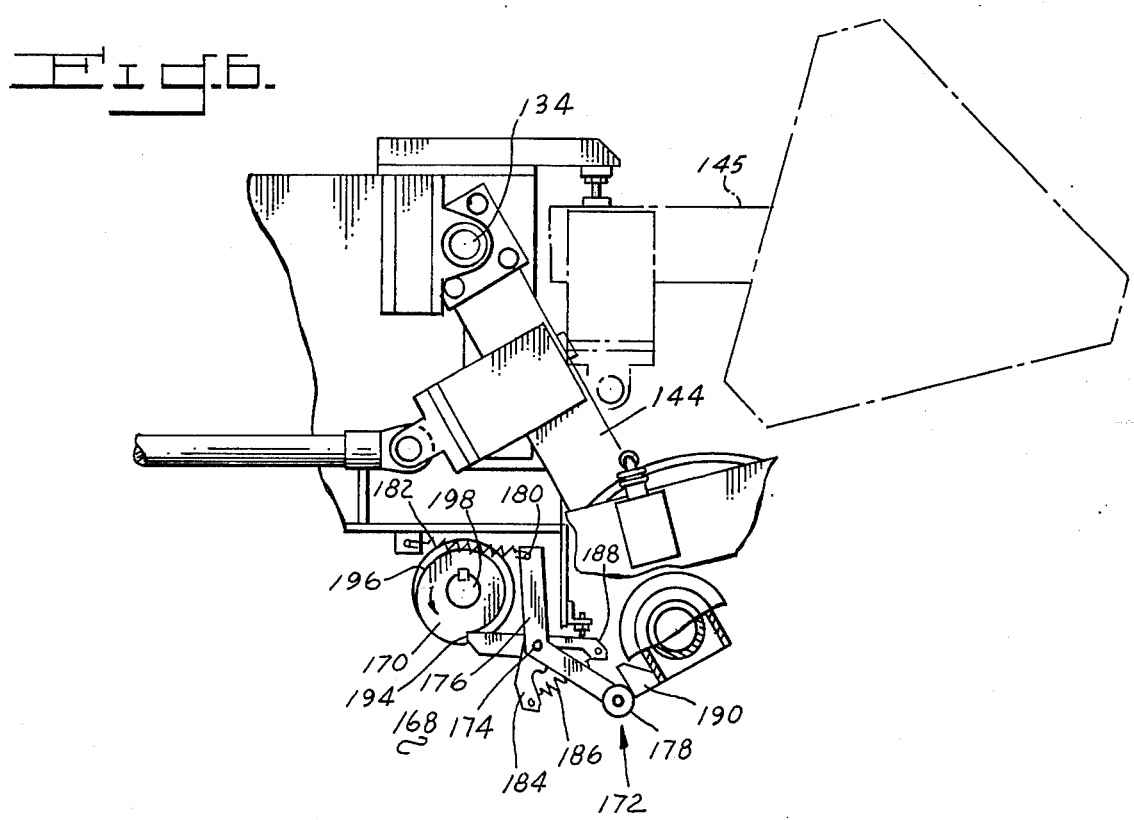

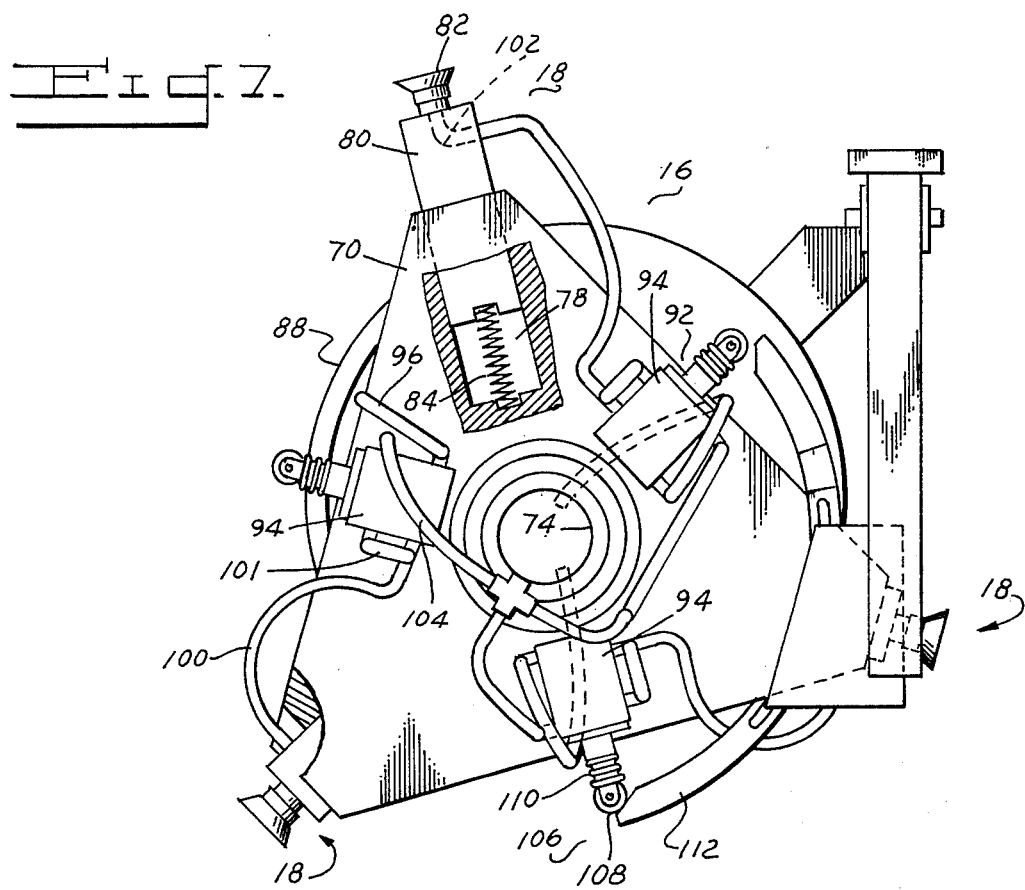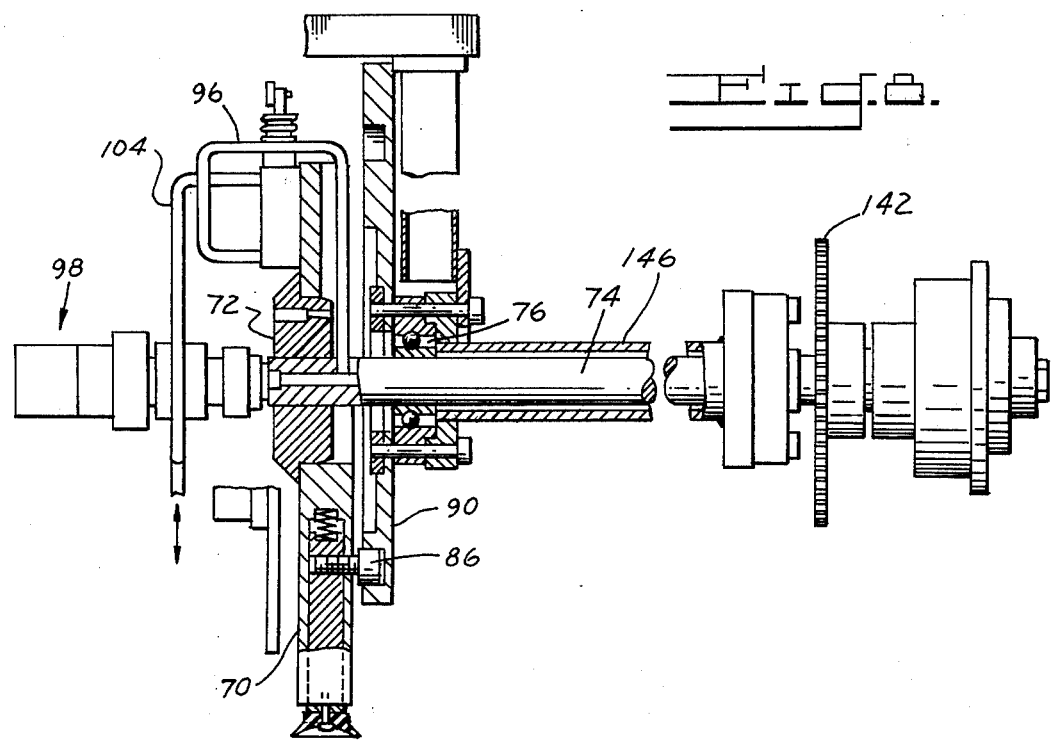

TAKEOUT APPARATUS FOR A BLOW MOLDING MACHINE

This application is a continuation-in-part of commonly owned U.S. application Ser. No. 492,001, filed July 26, 1974.

BACKGROUND OF THE INVENTION

This invention relates to removing articles from a blow molding machine and more particularly to apparatus for removing articles from a vertical, wheel blow molding machine of the type wherein the mold sections close and open parallel to the wheel axis.

In the past, blown articles have been individually removed in finished or semi-finished (i.e. with waste flash still attached) form from the discharge area of wheel blow molding machines by gravity ejection onto a chute feeding a conveyor supplying a surge hopper. An operation at the hopper outlet then usually manually fed the articles to the next downstream work station, such as a trimming machine. If the articles could be mechanically controlled during removal from the molding machine such that they could be forwarded directly to the next work station, manpower could be reduced and the hopper bypassed. Also, forwarding directly from the molding machine to the trimming machine insures a more uniform temperature of the plastic at the time of trimming and therefore a more uniformly trimmed article.

U.S. Pat. No. 3,770,098 discloses removal of containers from molds of a wheel machine of the type using hinged book molds wherein one section is rigidly mounted on a support and the other is pivotally attached thereto for opening and closing the mold.

An equally commercially popular wheel blow molding machine utilizes molds wherein each section simultaneously moves horizontally parallel to the machine axis during opening and closing. This type of movement has the advantage over other forms of evenly contacting the hot, tangentially fed parison with both sections of the closing mold at the same time, thus avoiding any uneven chilling effects which can occur when one portion of the mold contacts the parison appreciably ahead of another. With this type of machine employing horizontally operating molds, the formed part, just prior to release for gravity ejection from the machine, is conventionally suspended momentarily on the mold parting line in the mold-open portion of the machine periphery between a pair of article knockout pins while fully out of engagement with the recessed portions of each section. A more complete description of this type of machine is set forth, for example, in U.S. Pat. Nos. 3,218,669, 3,365,748 and 3,764,250.

Sequential removal of molded articles individually separated from each other in a controlled manner from a machine of the type referred to has, however, not been done, as far as is known, the system of the aforementioned 3,770,098 patent presenting substantial clearance problems between the arcuately downwardly descending arms of the system therein disclosed and the continuously moving mold sections of the machine.

In addition, and as set forth in detail in the aforementioned 3,764,250 patent, the continuously moving molds of the machine therein described capture portions of an upwardly extruding parison at about an eight-nine o'clock position and discharge the blown articles downwardly some 270° later at about a five-six o'clock position. With this machine geometry, the article discharge area is especially crowded since it is well within the confines of the machine proper and has dictated the use of a conveyor moving tangential to the circular path of mold travel to transport the gravity-discharged articles away on their sides in a relatively uncontrolled manner with respect to positional orientation thereof on the conveyor surface.

SUMMARY OF THE INVENTION

Now, however, apparatus has been developed for controlled removal of articles from a blow molding machine, and particularly such a machine of the vertically oriented, wheel type wherein the mold sections open and close horizontally parallel to the machine axis, with each mold parting line lying in a plane perpendicular to such machine axis.

Accordingly, a principal object of this invention is to provide apparatus for removing articles from a blow molding machine, particularly from the aforementioned type of such machine.

Another object is to provide such apparatus wherein each article is picked up and held in positive registration while moving between the mold unloading region of the machine and a downstream conveyor where it is gently deposited in spaced relation to the prior article in a controlled preselected attitude, such as an upright position resting on its base.

A particular object of this invention is to provide apparatus of the aforementioned type with provisions for moving the article-engaging parts sufficiently away from the wheel machine as to provide access to the molds for servicing without changing the synchronous relation between the molding machine and removal apparatus.

A specific object of this invention is to provide continuously operable apparatus for sequentially removing individually separated articles from molds in motion, in a controlled manner with respect to the positioned orientation thereof, which is especially suitable for use with a wheel machine wherein space availability is sparse in the area of article discharge from the molds.

Other objects of this invention will in part be obvious and will in part appear from the following disclosure and claims.

These and other objects are accomplished by providing takeout apparatus for a blow molding machine comprising a turret assembly including a plurality of article pickup devices, drive means for continuously rotating the turret assembly when in an operative position adjacent the path of movement of molds of the blow molding machine and in synchronism with such blow molding machine and turret assembly positioning means for moving the turret assembly to and away from such operative position.

BRIEF DESCRIPTION OF THE DRAWINGS

In describing the overall invention, reference will be made to the accompanying drawings wherein:

FIG. 5 is a vertical, sectional view along 5—5 of FIG. 3;

FIG. 6 is a partial, elevational view of part of the apparatus of FIGS. 3 and 4 illustrating an inoperative position thereof;

FIG. 7 is a front view of the turret assembly portion of the apparatus of FIG. 3; and FIG. 8 is a central, sectional, side view of the apparatus of FIG. 7.

DETAILED DESCRIPTION OF THE ILLUSTRATED EMBODIMENT

Figure 1:
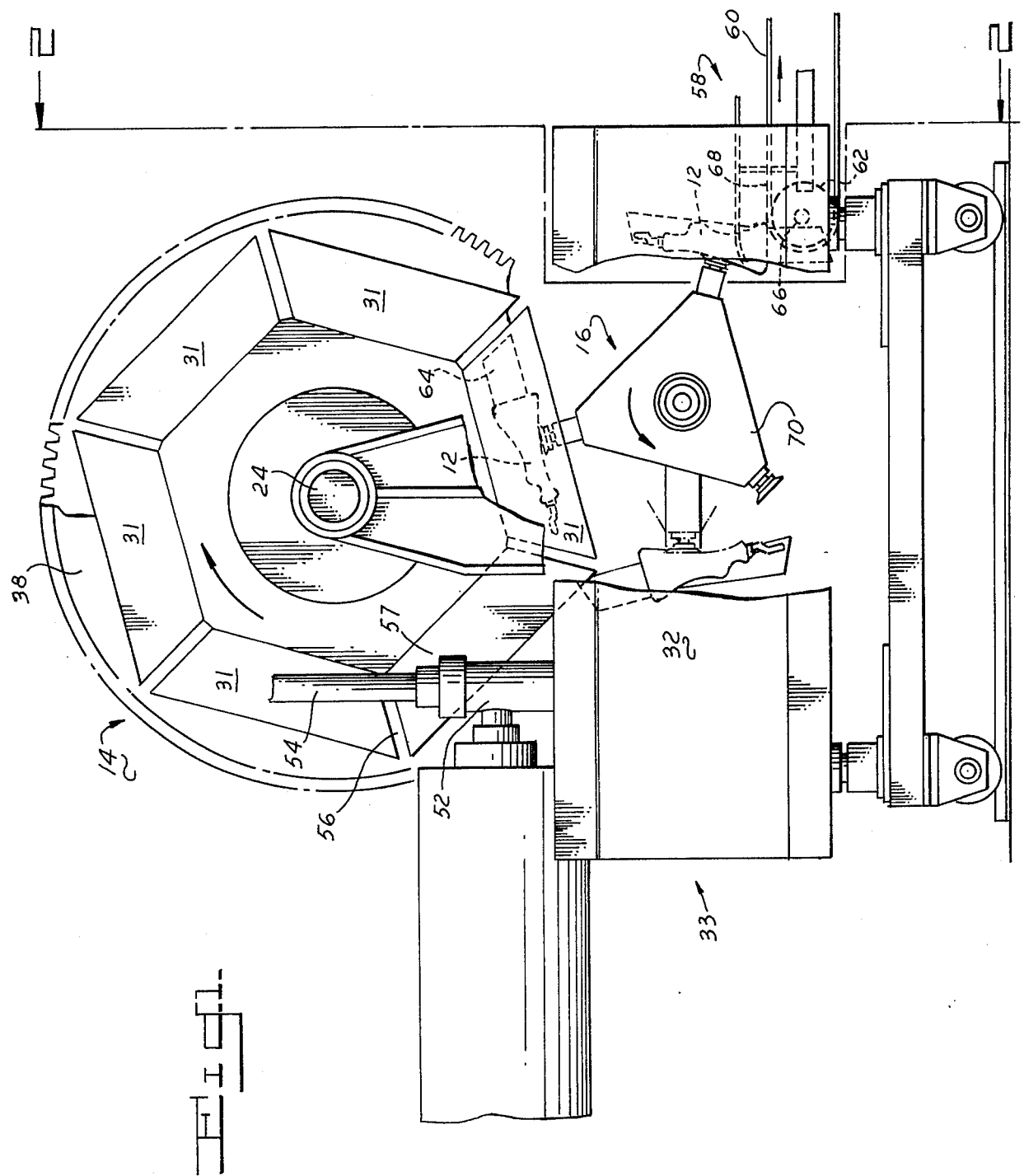
FIG. 1 is a partially schematic, front view of a molding machine-takeout apparatus assembly embodying the present invention.
Figure 2:
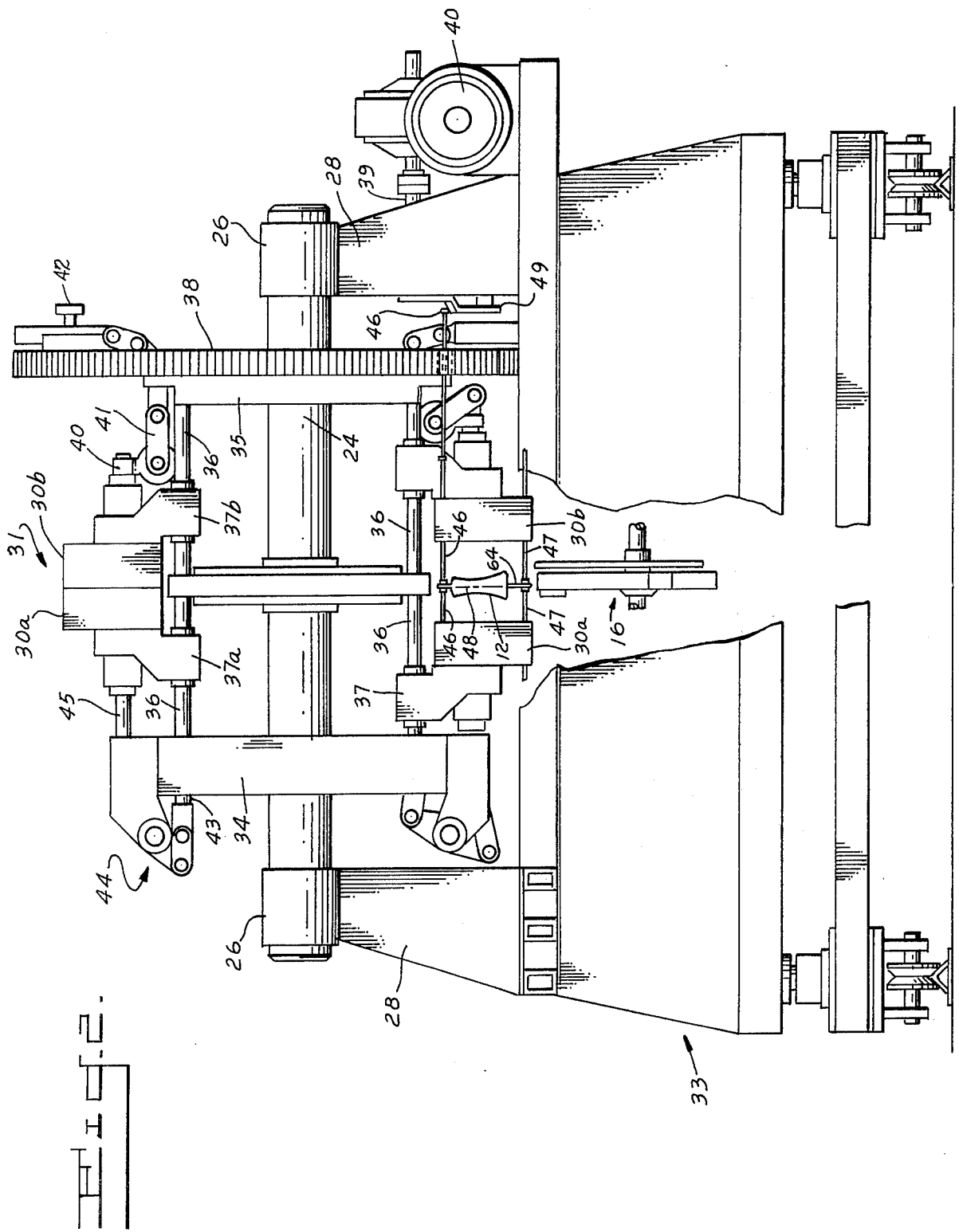
FIG. 2 is a partially schematic, side view along 2—2 of FIG. 1.
Figure 3:
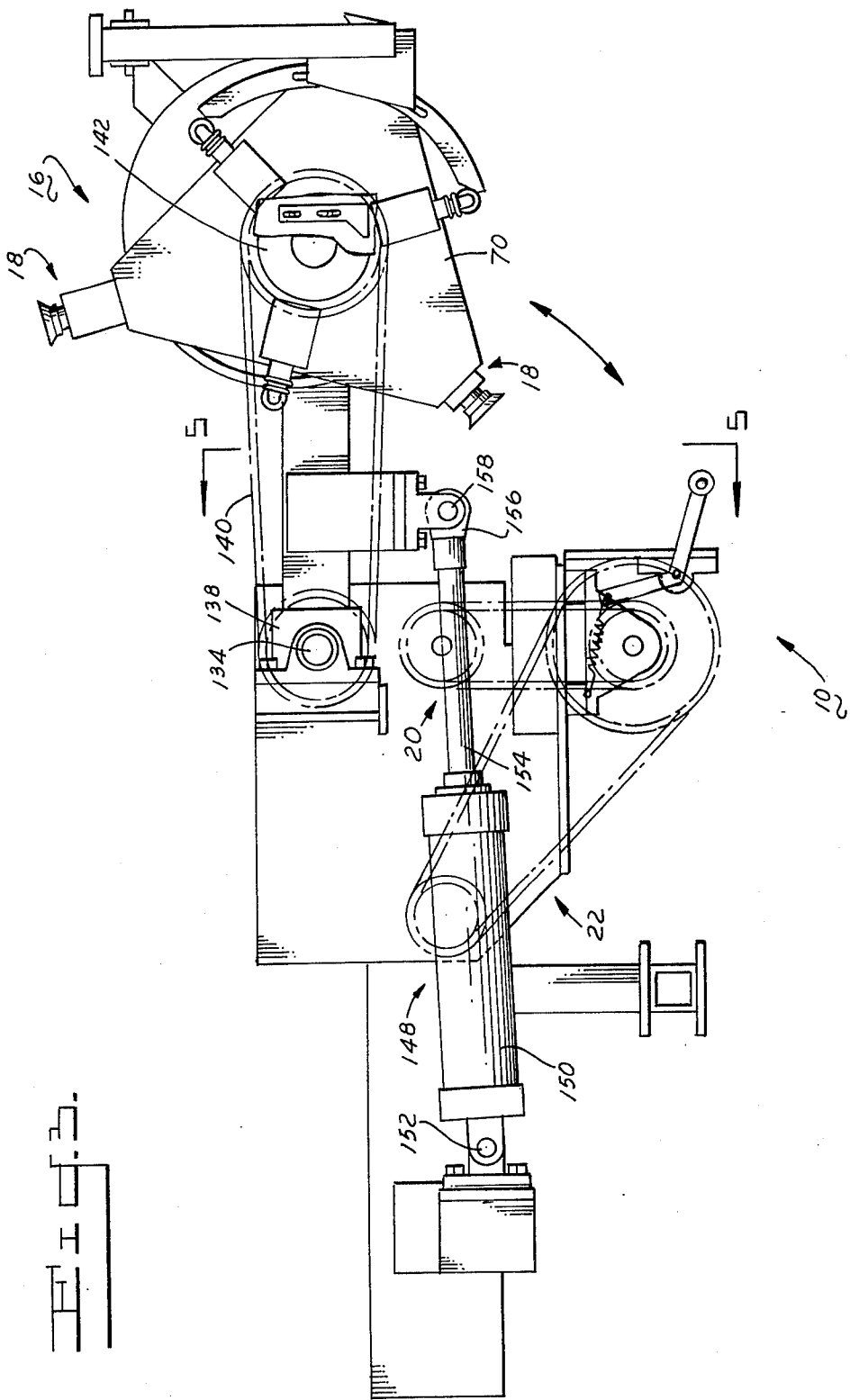
FIG. 3 is a front view in the same direction as FIG. 1 of the takeout assembly portion of FIG. 1.
Figure 4:
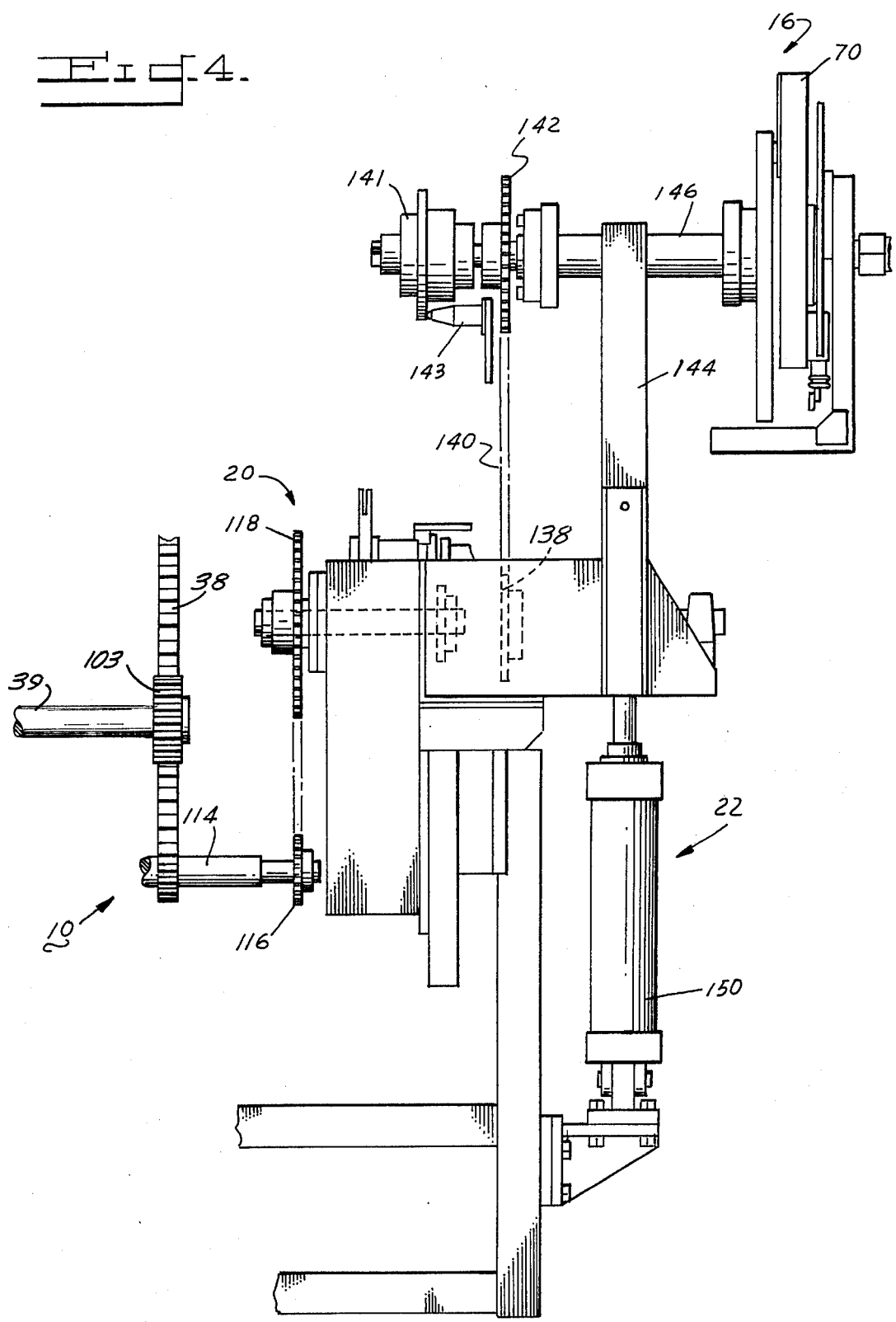
FIG. 4 is a plan view of the apparatus of FIG. 3.

Referring now to the drawings, takeout apparatus is therein shown and generally indicated as 10 (FIGS. 3 and 4) for removing articles such as untrimmed bottles 12 from a blow molding machine such as that generally indicated as 14 in FIGS. 1 and 2.

Apparatus 10 comprises turret assembly 16 including a plurality of article pickup devices 18, with three being shown as illustrative in the drawings, and which are preferably operatively associated with a source of negative pressure in a manner to be described, yet may alternatively be mechanically operable. Drive means 20 (FIG. 5) rotates turret assembly 16, preferably continuously, in synchronism with rotary movement of blow molding machine 14. Turret assembly positioning means 22 (FIG. 3) may be provided for moving turret assembly 16 toward and away from an operative position adjacent the path of movement of the molds of machine 14.

Blow molding machine 14, described in detail in U.S. Pat. No. 3,764,250, is generally shown to illustrate a system with which the takeaway apparatus of the invention is especially suitable for use, though it may be equally suitable for use with other forms of molding machine systems. Machine 14 (FIGS. 1 and 2) comprises a main shaft 24 journaled in bearings 26 on standards 28 and carrying mold support frame 34 and side casting 35 rigid therewith. A pair of guide rods 36 extend between frame 34 and casting 35 and slidably support a set of mold castings 37a, 37b which mount a pair of mold sections 30a and 30b which together form each mold 31. Bull gear 38 fixed to casting 35 is driven by a pinion 103 schematically shown in FIG. 4, on shaft 39 rotated by motor 40 of the machine drive system. Yoke 40 is secured to each mold casting 37b, to a pivot link 41 and is also associated with a push rod 43 between rails 36, which rod is slidable within castings 37 and extends through frame 34 connecting into linkage 44. Follower 42, one per each mold station, coacts during rotation of gear 38 with a mold actuating cam and suitable slide members and cranks, not here emphasized, to move link member 41 between the straight line position shown at the mold station in the upper part of FIG. 2 and an angular position shown at the station in the lower part of FIG. 2. In moving from the position of the latter station to that of the former station, link 41 moves yoke 40 and therefore casting 37b and mold section 30b to the left on rails 36. Such movement also urges push rod 43 to the left, which via linkage 44, urges upper push rod 45, casting 37a and mold section 30a to the right toward section 30b to close each mold 31. The reverse action, occuring as each mold approaches the lowest point in its circular path of travel, separates sections 30 to sequentially open the molds.

Two pairs, 46 and 47 (FIG. 2) of article-engaging knock-out pins, one pair adjacent the upper end and the other the lower end of each mold 31 extend through sections 30 and are ordinarily biased via suitable springs away from mold parting line 48 toward standards 28. Such pins are urged toward each other by cam plates, such as 49, on standards 28 as sections 30 separate at their article-release position of FIG. 1, resulting in each article (FIG. 2) being suspended between pin pairs 46 and 47 on parting line 48 and moving with sections 30, which position is most convenient for presentation to the pickup heads 18 of takeout apparatus 10.

Parison 54 is continuously formed in upwardly oriented extruder head 52 and portions thereof sequentially captured between closing mold sections as they pass adjacent the extruder head outlet. Severance of parison 54 into individual segments can occur in a variety of known ways during closing of the mold sections. For example, a cut-off blade mounted on the forward face of a section of each mold, e.g. generally in the area 56 for the mold identified as 57 (FIG. 1), bisects parting line 48 so as to scrape across the top face of the opposite section on closing of a mold, thereby severing the thermoplastic parison being clamped therebetween.

As illustrated in FIGS. 1 and 2, machine 14 is vertically disposed on framework generally indicated as 33 which generally encloses all four sides of the lower portion of the machine structure. The space between the supporting floor and the molds in their lowermost position in the circular path of travel, plus that in the area (FIG. 1) generally indicated as 32 between extruder head 52 and the release position of article 12 from its mold, is generally quite minimal for location of machinery components. Nevertheless, in such an environment, turret assembly 16 (FIG. 1) is preferably located within machine framework 33 of molding machine 14, generally adjacent a five o'clock position with respect to the circular arrangement of molds 31 when viewing the machine from the front side of FIG. 1.

Downstream article handling equipment for receiving articles 12 from apparatus 10 and transporting them to the next downstream station may be provided and in the illustrated embodiment comprises take-away conveyor means 58 (FIG. 1) generally perpendicular to the axis of turret assembly 16 and including an endless rope 60 supported at one end of the conveyor on an idler pulley 62 and driven at a downstream end, not shown, in a conventional manner. A pair of laterally spaced parallel stabilizing bars 68 above rope 60 straddle either side of an article 12 during conveying movement to prevent it from toppling sideways.

In accordance with the invention, turret assembly 16 comprises (FIG. 7) a substantially vertically disposed turret plate 70, which is triangular-shaped in the illustrated embodiment but may assume a variety of alternative forms, having a central opening around which hub 72 is welded and secured, e.g., via a key member, not shown, to turret shaft 74 journaled for rotation via bearings typically illustrated at 76. Outwardly opening cutout 78 is formed in the end of each side of turret plate 70 and slidably receives as part of each device 18, a preferably non-pivotally mounted pickup head equally spaced from the other two shown, and comprising block member 80 having pickup member 82 on its forward end which, in the illustrated embodiment, is cup-like in contour. When negative pressure is used for article pickup, each member 82 is preferably contoured to match the surface portion of the article which it engages on extracting the latter from between the knock-out pin pairs. When available space is at a premium in the area of article takeout, pickup devices 18 may include means, such as compression spring 84, biasing block member 80 outwardly toward the periphery of turret plate 70. Controlled, extendible-contractible movement of each block member 80 in opposition to and cooperation with spring 84 is achieved by a journaled roller 86 on a stub shaft fitted to each block 80 which is in continuous contact with profile surfaces 88 of a track formed in fixed cam 90 during rotation of turret plate 70.

Each pickup device 18 also includes valve means, generally indicated as 92 (FIG. 7), operatively associated with its pickup member and which comprises an industrially available multi-port air valve 94, a first conduit 96 secured to and open at one end to one port in valve 94 having its other end in open communication through shaft 74 and rotary union 98 with a source of negative pressure, a second conduit 100 between each such valve 94 and pickup member 82, with passage 102 in block member 80 extending communication between member 82 and the end of conduit 100. As a feature of the invention, third conduit 104 connected at one end to another port in valve 94 and open at its other end to a source of positive pressure through rotary union 98 may be provided with crossover branch 101 on the outlet side of valve 94 in communication with conduit 100 for such pressure connection. Valve cam actuation means 106 selectively operates each such valve 94 to either impose a negative or positive pressure on pickup member 82 during each revolution of turret plate 70, and comprises rotary follower 108 on swivel connection 110 which in turn is on a projecting portion of each valve 94, plus adjustably positioned valve cam 112.

Drive means 20 for rotating turret shaft 74 in synchronism with blow molding machine 14 when assembly 16 is in the operative position of FIG. 1 adjacent the path of movement of molds 31, exemplarily comprises (FIGS. 4 and 5) jack shaft 114 operatively connected to a power takeoff shaft of the motor means for turning bull gear 38 of machine 14. Drive sprocket 116 on shaft 114 is chain-connected (FIG. 5) to driven sprocket 118 on intermediate shaft 120 which is journaled for rotation in pillow blocks such as 122. Phase variator drive sprocket 124 rotatable with shaft 120 is chain-connected to phase variator driven sprocket 126 rotatable with the input shaft of industrially available phase variator 128 (Candy Mfg. Co., Chicago, Ill., Model 40-2), which serves as the adjustable member for synchronously tuning the rotary movement of molding machine shaft 24 and turret drive shaft 74. Output shaft 130 of phase variator 128 is coupled at 132 to secondary shaft 134 which is journaled for rotation via pillow blocks 136. Turret assembly drive sprocket 138 on secondary shaft 134 is chain-connected at 140 (FIGS. 3 and 4) to driven sprocket 142 secured on turret drive shaft 74 (FIG. 8). A torque responsive conventional safety clutch (FIG. 4) may be provided on shaft 74 e.g., comprising a housing 141 which, on excessive resistance to revolving movement of turret 70 because of a malfunction such as interference with a locally adjacent mold, will move rearwardly against limit switch 143 which may be conventionally wired to shut down the system when this occurs. Input power originating with motor 40 of the means for turning machine 14 is therefore transmitted via the drive train just described to sprocket 142 to impart rotary motion to turret shaft 74 carrying turret plate 70.

Turret assembly positioning means 22 (FIGS. 3-6) may be provided and in the illustrated embodiment includes turret assembly support arm 144 mounted for periodic hinged movement via pivot bearings about secondary shaft 134, and having an integral tubular, laterally extending portion 146 (FIG. 8) with flanged ends serving as the support for mounting mating flanges of housings containing bearings 76 for shaft 74, such that the latter is rotatably supported with laterally extending portion 146. Actuating means for swingably moving arm 144 includes a linear actuator such as fluid motor means 148 comprising cylinder member 140 pivotally mounted about cross pin 152 having telescoping piston rod portion 154 with clevis 156 at its forward end through which pivot pin 158 extends. Loop portion 160 (FIG. 5) of branched bracket 162 has a through-hole therein for pin 158 with side members 164, 166 being secured to arm 144 intermediate its pivotal mounting on secondary shaft 134 and lateral portion 146. On retraction of rod portion 154 to the position shown in full lines in FIG. 6 from that shown at 145 therein, preferably via a remotely actuated solenoid valve in a pneumatic system associated with cylinder 150, not shown, turret assembly support arm 144, via the action of rod 154 and the associated pivotal mounting about shaft 134 and pin 158, will be drawn downwardly approximately 45° such that supported turret assembly 16 is drawn back from its operative position adjacent the periphery of the circular path of the revolving molds. This inoperative position is desirable since from time to time it is necessary to operate machine 14 without using apparatus 10, e.g., during startup when articles 12 may not be fully blown and sequentially ejected at the full operating rate of the machine. On such occasions it is desirable, primarily from a safety standpoint, that turret assembly 16 be non-rotating and out of the way of an operator who frequently must physically place himself within the confines of framework 33 to manually clear molds of waste plastic if the bottle blowing process is not preforming properly. To accomplish such positive cutoff of power to shaft 74 while allowing shaft 24 of machine 14 to operate, with both shafts driven from a single power source, clutch means, generally indicated in FIG. 6 as 168 may be provided as a feature of the invention to prevent rotation of turret shaft 74 when support arm 144 is in the inoperative position of FIG. 6 at the upper extremity of the arc generated by its pivotal movement about shaft 134. Clutch means 168 is an integral part of drive means 22 and comprises industrially available single revolution clutch 170 on intermediate shaft 120 (FIG. 5) plus clutch actuation means 172 (FIG. 6) associated with turret assembly 16. Clutch actuation means 172 comprises shaft 174 journaled for pivotal movement and carrying V-shaped arm 176 rigid therewith which has journaled follower 178 at one end and is attached at 180 to extension spring 182 secured to a fixed support. Finger 184, force fitted at one end to pivot shaft 174, has pull spring 186 secured to its other end, which in turn is attached to pawl 188 tolerance fitted and slidably turnable on shaft 174. Shoe 190 on a bracket on turret assembly 16 is in planar alignment with follower 178. Thus, when turret assembly 16 is in the operative position of FIG. 3, shoe 190 is well spaced from follower 172, but when assembly 16 is drawn downwardly to the inoperative position of FIG. 6, shoe 190 strikes follower 178, which, via rigid arm 176 causes shaft 174 to pivot clockwise in opposition to spring 182. Since finger 184 engaging spring 186 is rigid with shaft 174, this movement of the latter increases the pressure of end 194 of pawl 188 against surface 196 of clutch 170. Thereafter, when the stepped extremity of clutch-disengaging slot 196 reaches pawl 188, forward end 194 falls into it to prevent further relative movement of shaft 198 or of the turret assembly drive train downstream of clutch 170. Therefore, power to further rotate turret drive shaft 74 is positively cut off while such engagement continues even though blow molding machine shaft 24 may be turning. The power input to clutch 170 during such engagement of the parts is absorbed in a planned manner by internal components of clutch 170 commercially available e.g., as Hilliard Model No. 4–1–6L, while shaft 24 of molding machine 14 continues to turn. When turret assembly positioning means 22 swings turret assembly support arm 144 to the 145 position of FIG. 6, shoe 190 is disengaged from follower 178 whereupon spring 182 via arm 176 pivots shaft 174 counter-clockwise, which movement, since arm 184 is fixed to shaft 174, causes pawl 188 to exit notch 196 whereupon power can again be transmitted forward to turn turret drive shaft 74.

When moving turret assembly 16 in the manner just described to the inoperative position of FIG. 6, the synchronous relationship between turret assembly 16 and blow molding machine 14 is not disturbed since phase variator 128 which serves as the means for establishing such relationship remains in fixed position upstream of the point of pivotal movement of support arm 144 about secondary shaft 134.

In operation, shaft 24 of blow molding machine 14 is continuously rotating and the sections of each mold 31 sequentially closing on a portion of upwardly extruding parison 54 in the manner generally illustrated in FIG. 1, such closing action severing the continuous parison into separate lengths. As each mold 31 traverses its circular path from the charging area immediately above the extrusion head to the article-release position some 270° away, the captured parison length is expanded outwardly in conventional manner via suitable means such as a hollow needle and pneumatic pressure source, not shown, against the walls of the mold cavity to form the article. In the illustrated embodiment, waste flash such as tail portion 64 and neck moil 63 at the opposite end is formed integral with the article during mold closing and must be removed downstream before the article can be considered to be in final form. As the forward portion of a mold 31 approaches the article-release zone in the vicinity of five o'clock with respect to FIG. 1, contoured resilient pickup member 82 of a pickup head 18 is moving in a tracking orbit at the same velocity as that of the mold and of the article being held on the mold parting line 48 by the knock-out pins. At this point in the cycle, follower 108 is out of contact with cam member 112, which position results in a negative pressure being imposed on pickup member 82. In the illustrated embodiment, continued rotary movement of a mold 31 and pickup member 82 brings the outwardly flaring surface portion along the length of article 12 (FIG. 1) and pickup member 82, which is in its extended position, into tangential relationship to each other whereupon the article is drawn out from between the knock-out pins against contoured member 82 and held there by the negative pressure. Continued counter-clockwise rotation of turret assembly 16 thereafter moves article 12 with relatively long tail 64 arcuately downwardly past the lower end of extruder head 52 through the area indicated as 32 in FIG. 1. During traversal of this portion of the removal path, follower 86 and the contour of the track of cam 90 within which it moves may urge block member 80 inwardly in opposition to compression spring 84 to draw the engaged article inwardly toward the center of turret plate 70 to ensure that it, and particularly the projecting tail portion 64, moves in an unobstructed manner through the approximately 180° of relatively tight area around the lower end of extruder head 52 without striking anything. Such inward retractive movement also serves to move the engaged part out of the path of the next oncoming mold. As can be realized, engagement of the article in the flash area at either end or even along the body toward one end or the other could, depending on the article dimensions, present clearance problems in area 32 or between the article and the floor during turning movement after pickup. As turret assembly 16 continues to rotate, the article as best determined from FIG. 1, is progressively turned toward an upright position as it approaches the feed end of conveyor means 58. After it has been moved through the area 32 of close clearances, block member 80 via cam 90, follower 86 and spring 84 is allowed to telescope outwardly at about a three o'clock position with respect to the orientation of turret assembly 16 in FIG. 1. At this point, when it is desirable to deposit the article on the conveyor, follower 108 of valve 94 engages the surface of cam 112 which results in closing the negative pressure port of valve 94 and opening the positive pressure port thereof via conduit 104. When this positive pressure is transmitted to pickup member 82 it gently pushes the engaged article forward out of the cup-like member and onto rope 60 of conveyor means 58. The article is then carried away to the next downstream station while resting on its base on rope 60 with tail portion 64 protruding downwardly beside same and its upper end guided between bars 68. Thus, physical contact for the purpose of orientation control is maintained during the entire removal phase of each individual article from its mold from the point where it is pulled from between the knockout pins until urged onto the takeaway conveyor means. After release, the unloaded pickup head then proceeds continuously in a counter-clockwise direction to pick up another article as it arrives at the five o'clock release position of the machine.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. Takeout and transfer apparatus in combination with a blow molding machine which is vertically disposed on framework and includes a plurality of molds circularly arranged about a horizontal axis, each mold comprising partible sections openable and closeable parallel to said axis, said apparatus comprising:
   a. a vertically oriented turret assembly located within said framework generally adjacent a five o'clock position with respect to the circular arrangement of the molds when viewing the machine from the front side, said assembly including a plurality of article pickup devices each of which includes a telescopically mounted pickup head for receiving articles from the molds;

b. drive means operatively connected to said turret assembly for continuously rotating the turret assembly in synchronism with the blow molding machine;

c. conveyor means adjacent the turret assembly for receiving and transferring articles from the pickup heads;

d. positioning means connected to said pickup devices for sequentially retracting each pickup head inwardly toward the turret assembly as it traverses a generally circular path toward the conveyor means after receiving an article from a mold to allow each head and engaged article to move through such path in an unobstructed manner.

2. Takeout apparatus for a blow molding machine comprising:

A. a turret assembly comprising:
  a. a substantially vertically disposed rotatable turret having cutouts formed therein;
  b. a plurality of pickup devices, each comprising:
    i. a block member in one of said cutouts carrying a pickup member on its forward end;
    ii. valve means operatively associated with each such pickup member; and
    iii. means biasing said block member outwardly toward the periphery of the turret;
  c. pickup member cam positioning means in continuous cooperation with each block member during rotation of the turret to move each such pickup member in opposition to and cooperation with the biasing means; and B. drive means operatively connected to said turret assembly for rotating the turret assembly in synchronism with the blow molding machine.

3. The apparatus of claim 2 wherein said valve means includes:
  I. a valve;
  II. a first conduit between the valve and a source of negative pressure;
  III. a second conduit between the valve and the pickup member; and
  IV. cam actuation means operatively connected to said valve for selectively operating said valve during a portion of each revolution of the rotative turret.

4. The apparatus of claim 3 including a third conduit in operative communication with the valve and a source of positive pressure.

5. Takeout apparatus for a blow molding machine comprising:

A. a turret assembly including:
  a. a rotatably mounted turret shaft; and
  b. a turret plate rotatable with said shaft carrying a plurality of article pickup devices;

B. turret assembly positioning means including:
  a. a pivotally mounted turret assembly support arm having a portion supporting the rotatably mounted turret shaft; and
  b. actuating means associated with said support arm for moving it about the pivot; and C. drive means operably connected with the blow molding machine for rotating the turret shaft and including an adjustable member for synchronously tuning the movements of the blow molding machine and turret shaft, said member being located between said operable connection and the pivot mounting for said turret assembly to permit moving the turret assembly out of operative position with respect to said machine by said turret assembly positioning means without changing the synchronous relation between the machine and turret shaft.

6. The apparatus of claim 5 wherein said actuating means includes fluid motor means comprising a pivotally mounted fluid motor having a piston rod pivotally associated with said support arm between the pivot point of said arm and the portion supporting the turret shaft.

7. The apparatus of claim 5 wherein said drive means includes clutch means preventing rotation of the turret shaft when the support arm is at one extremity of an arc generated by said pivotal movement and said blow molding machine is operating.

8. The apparatus of claim 7 wherein said drive means includes:

A. a turret assembly drive train operatively connected to motor means for operating the blow molding machine;

B. clutch actuation means associated with the turret assembly drive train.

* * * * *